(12) United States Patent
Lefor et al.

(10) Patent No.: US 6,672,091 B1
(45) Date of Patent: Jan. 6, 2004

(54) ATOMIZATION DEVICE FOR A REFRIGERANT

(76) Inventors: Randy Lefor, 810 E. Cambridge, Phoenix, AZ (US) 85006; Zachary Kodros, 12822 W. Clarendon, Avondale, AZ (US) 85323

( * ) Notice: Subject to any disclaimer, the term of this patent is extended or adjusted under 35 U.S.C. 154(b) by 0 days.

(21) Appl. No.: 10/349,223

(22) Filed: Jan. 22, 2003

Related U.S. Application Data

(60) Provisional application No. 60/351,409, filed on Jan. 23, 2002.

(51) Int. Cl.[7] .................................................. F25B 41/04
(52) U.S. Cl. ............................ 62/223; 236/75; 239/690
(58) Field of Search ................ 62/223, 210; 236/92 B, 236/75; 239/690, 690.1, 692, 96, 705

(56) References Cited

U.S. PATENT DOCUMENTS

| | | | | |
|---|---|---|---|---|
| 4,335,851 A | * | 6/1982 | Hastings ........................ 239/3 |
| 4,502,629 A | * | 3/1985 | McGhee et al. ................ 239/3 |
| 4,548,047 A | * | 10/1985 | Hayashi et al. ............... 62/160 |
| 4,549,404 A | * | 10/1985 | Lord ........................... 62/224 |
| 4,721,255 A | * | 1/1988 | Lind ........................... 239/690 |
| 6,085,996 A | * | 7/2000 | Culbertson et al. .......... 239/290 |
| 6,116,184 A | * | 9/2000 | Solayappan et al. ....... 118/50.1 |
| 6,375,086 B1 | * | 4/2002 | Babin et al. .............. 236/92 B |
| 6,522,039 B1 | * | 2/2003 | Baltz et al. .................... 310/88 |

FOREIGN PATENT DOCUMENTS

| EP | 607953 a | * | 7/1994 |
|---|---|---|---|
| JP | 09280696 A | * | 10/1997 |

* cited by examiner

*Primary Examiner*—William C. Doerrler
*Assistant Examiner*—Mohammad M. Ali
(74) *Attorney, Agent, or Firm*—Gregory J. Nelson

(57) ABSTRACT

An expansion device for refrigeration system having a piston which reciprocates to either open or close ports to increase or decrease the volume of atomized refrigerant liquid received from the condenser. Atomization may be enhanced by use of auxiliary ultrasonic or electrostatic atomization devices.

7 Claims, 5 Drawing Sheets

ATOMIZATION DEVICE FOR A REFRIGERANT

This application is based on provisional application Ser. No. 60/351,409, filed Jan. 23, 2002, entitled "Atomization Valve For Refrigerant."

FIELD OF THE INVENTION

The present invention relates to an atomization device for a refrigeration system and more particularly relates to a device for efficiently converting liquid refrigerant from the condenser to a super saturated vapor.

BACKGROUND OF THE INVENTION

A typical vapor compression refrigeration system includes a compressor, a condenser an evaporator and an expansion device arranged to transfer heat energy between a fluid in heat transfer relationship with the evaporator and a fluid in heat transfer relationship with the condenser. Refrigeration systems of this type are widely used in applications such as ice machines, automotive air conditioners, cascade systems and refrigeration systems for walk-in coolers. Some such systems may be reversible systems and are designated as heat pump systems often used for residential heating and cooling.

In the refrigeration cycle, the compressor directs a hot, gaseous refrigerant to the condenser. Heat energy is rejected at the condenser and heat is absorbed at the evaporator. Refrigerant from the condenser passes through an expansion valve where the liquid is atomized and evaporated. The expanded and atomized liquid is then directed to the evaporator coil. Cooling occurs as heat is absorbed by the refrigerant. Various types of expansion devices can be found in the prior art. For example, U.S. Pat. No. 4,263,787 shows an expansion device having a piston slidable between first and second positions within a valve body. In the first position, the piston meters refrigerant flow there through and in the second position the piston allows refrigerant to flow unrestricted through the device. Means are disclosed for adjusting the throttling of the refrigerant through the device when it is acting as an expansion device.

Another piston expansion device is shown in U.S. Pat. No. 5,041,257. This patent shows expansion device having a movable piston having a first end surface adapted to engage a valve seat to close the valve when the piston is in the first position. When the piston is disposed in the second position, the piston has a passage there through which interconnect ports.

Yet another expansion valve assembly is shown in U.S. Pat. No. 4,911,404. Again, a piston is mounted in a body and is actuated by a stepper motor. In other patents disclosing expansion devices having a movable piston include U.S. Pat. No. 5,894,741. Thus, while there are various expansion devices which utilize a piston that can be found in the prior art, most are complex having numerous components and requiring more elaborate sealing and flow passageways.

Accordingly, it is the object of the present invention to provide a simple expansion or atomization device which will effectively atomize liquid refrigerant to provide greater heat transfer efficiency in the evaporator. It is yet another object of the present invention to provide an economical, reliable and adjustable atomization and expansion device for refrigerants.

BRIEF SUMMARY OF THE INVENTION

The above and other objects are achieved by an expansion device which has a housing having an inlet port receiving liquid from the condenser. The housing has multiple outlet ports which direct supersaturated vapor to the evaporator or to an intermediate receiver. The liquid from the condenser is received within the body of the atomizing valve in the housing. The body of the valve is provided with a plurality of orifices or nozzles at spaced-apart locations along its length. A piston is reciprocable within the valve body and as the piston moves in one direction or the other, will either communicate the orifices or nozzles with the liquid or close off the nozzles or orifices and reduce the volume of the liquid-receiving valve chamber.

Preferably the position of the piston is controlled by a stepper motor operated by a temperature sensor on the evaporator coil. As the temperature decreases, the piston will move in a direction to decrease the volume of the valve chamber. The liquid entering the valve chamber will expand and vaporize and exit the valve body through the orifices or nozzles, the number of which will be determined by the position of the piston within the valve body. The expansion device of the present invention will significantly reduce compressor failure as a result of liquid carry-over.

BRIEF DESCRIPTION OF THE DRAWINGS

The above and other objects of the present invention will be more fully understood from the following description, claims and drawings in which:

FIG. 4A is a section along line 4A—4A of FIG. 4; and

DETAILED DESCRIPTION OF THE INVENTION

Figure 1:
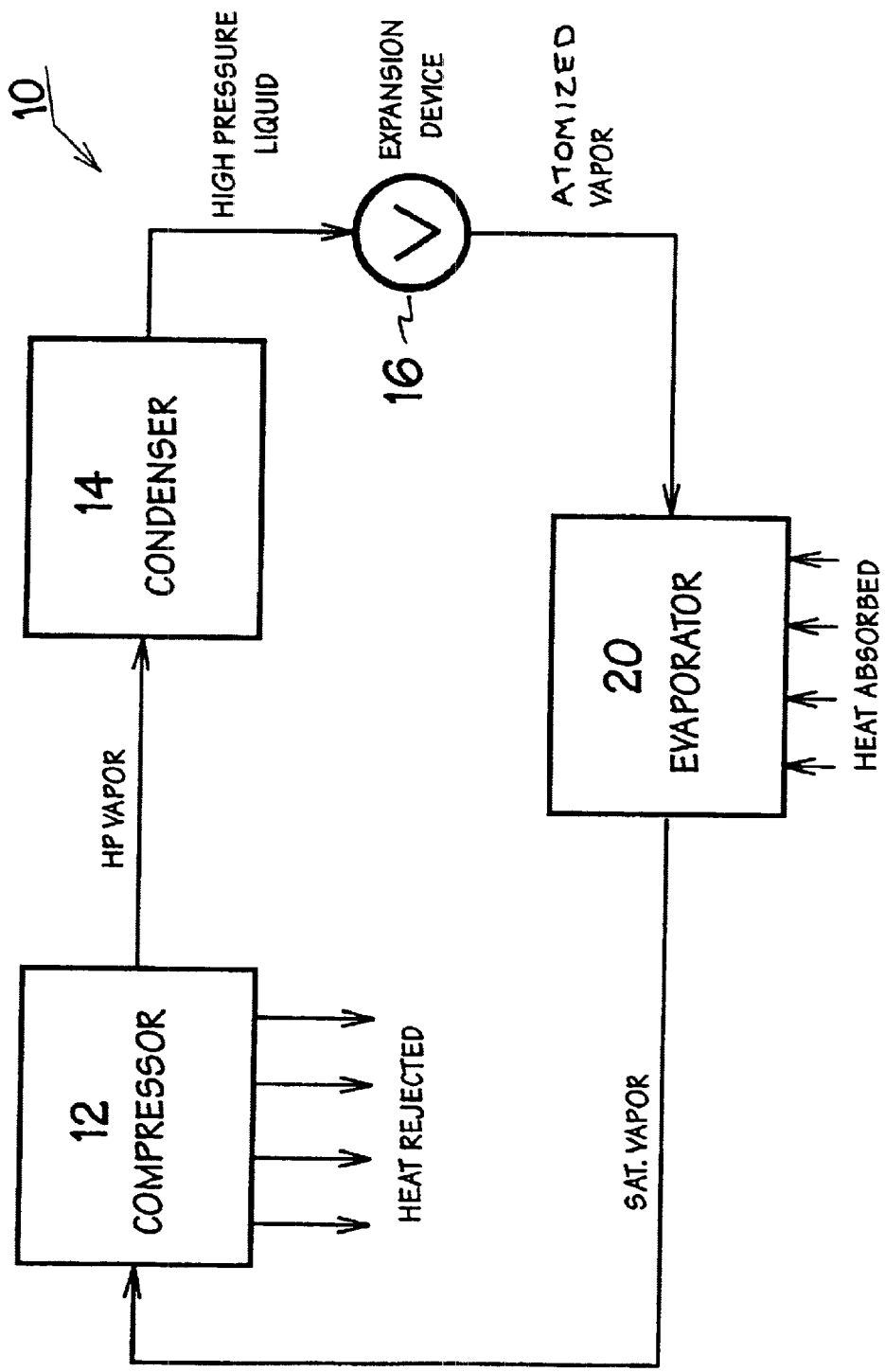
FIG. 1 is schematic showing a representative of refrigeration circuit with the valve of the present invention installed therein.

The invention, as described, will typically be installed in a refrigeration circuit as shown in FIG. 1. The typical refrigeration circuit uses a compressible refrigerant. The refrigeration effect is achieved by evaporating liquid having a relatively low boiling temperature such as Freon 22 being currently mandated because of environmental concerns. The same numerals have been used throughout to designate the same or equivalent elements.

The compression refrigeration system 10 consists of a compressor 12 in which the refrigerant is a vapor and is raised in pressure usually with simultaneous cooling. A condenser 14 is provided in which heat is removed from the compressed refrigerant causing it to condense to a liquid. The system includes an improved expansion valve 16 in which a Joule-Thomson expansion occurs and results in the evaporation of some of the liquid and cooling of both the liquid and vapor to the temperature of the evaporator or expansion coil 20 in which the rest of the liquid is converted to vapor by absorption of heat from the space to be coiled. From the evaporator, the refrigerant, which is saturated vapor, flows to the compressor 12 for reuse.

Compressors may be of various types and similarly the evaporator and condensers may be various types. The heat exchangers may be tube or finned for better heat transfer. The particular type of components may depend upon the particular application such as residential refrigeration or cooling industrial or commercial applications such as walk-in coolers.

The expansion device 16 of the present invention is suitable for application in these various systems. The expansion device 16 of the present invention provides atomization and evaporation of the liquid from the condenser and, as shown, interposed between the condenser and evaporator.

Figure 2:
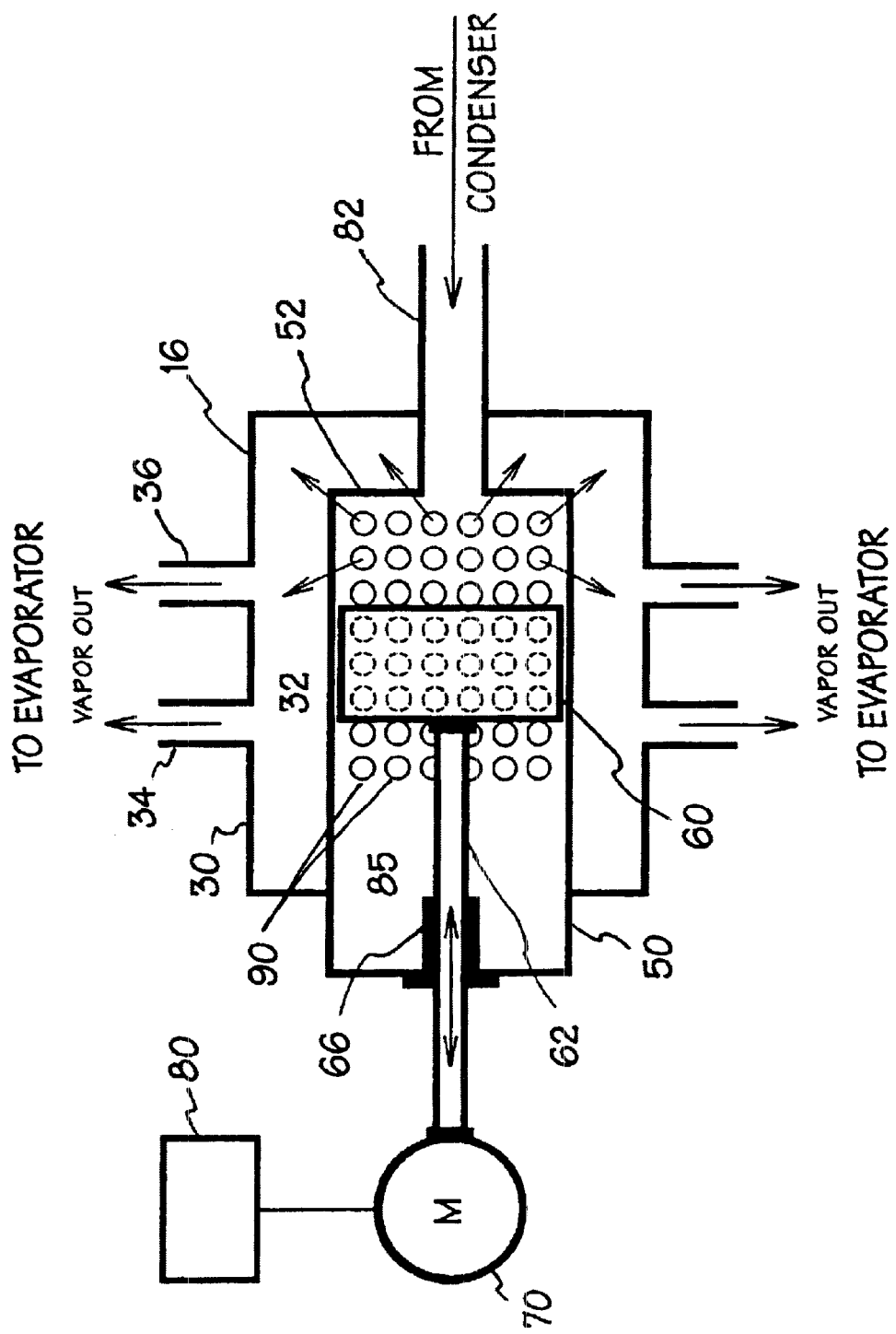
FIG. 2 is a cross-sectional view showing the expansion device of the present invention.

Referring to FIG. 2, it will be seen that the device 16 of the present invention has an exterior housing 30 which defines an internal chamber 32 for receiving the atomized liquid. The chamber is shown as having a plurality of outlet ports 34, 36 which are in parallel and communicate with the evaporator 20. Inlet 82 receives high pressure liquid from the condenser. Preferably the outlet ports are arranged at spaced-apart locations on the housing communicating with the internal chamber 32. The exterior housing may be any suitable material which will resist corrosion and which is suitable for operating temperatures typically between 40° F. and 60° F. and pressures typically between 0 and 100 PSI.

An elongate, generally cylindrical, valve body 50 having a head end 52 is received within the chamber 32. The opposite rod end extends outwardly of the chamber housing 30. A piston 60 is reciprocal within the valve chamber 85 and has a piston 60 connected to a rod 62. The piston 60 and valve body are of suitable materials such as stainless steel. The rod extends through the closed rod end of the cylinder 50 at a suitable seal 66.

A stepper motor 70 is operably connected to the rod 66 to reciprocate the piston within the valve chamber. The stepper motor is shown as being controlled by a temperature sensor 80 located at a suitable point in the system such as on the evaporator coil. As temperature decreases, the stepper motor will be actuated to move the piston in a rightward direction, as shown in FIG. 2. As the evaporator temperature rises, the piston will move in the opposite, leftward direction as shown in FIG. 2.

The head end of the valve is connected at an inlet port 82 to the line leading from the condenser. Thus, liquid from the condenser is directed to the valve chamber 85. It will be seen in FIG. 2 that the cylinder is provided with a plurality of orifices 90. Preferably the orifices are approximately 0.005" to 0.05" inches in diameter may all be the same size or slightly different sizes. The orifices 90 are axially arranged about the body of the cylinder. Thus it will be seen that as the piston moves rightwardly, the volume of the liquid chamber will decrease and fewer orifices 90 will be exposed through which liquid may exit. Accordingly, as the liquid exits the orifices, it will be caused to atomize and expand. The atomized liquid passing through the orifices will enter the annular chamber 32 about the valve body and pass through one of the vapor outlets 34, 36 to the evaporator.

As the temperature sensor 80 on the evaporator coil senses a change in temperature, the piston will be caused to reciprocate to open or close the orifices and vary the volume of the liquid chamber within the cylinder.

Figure 3:
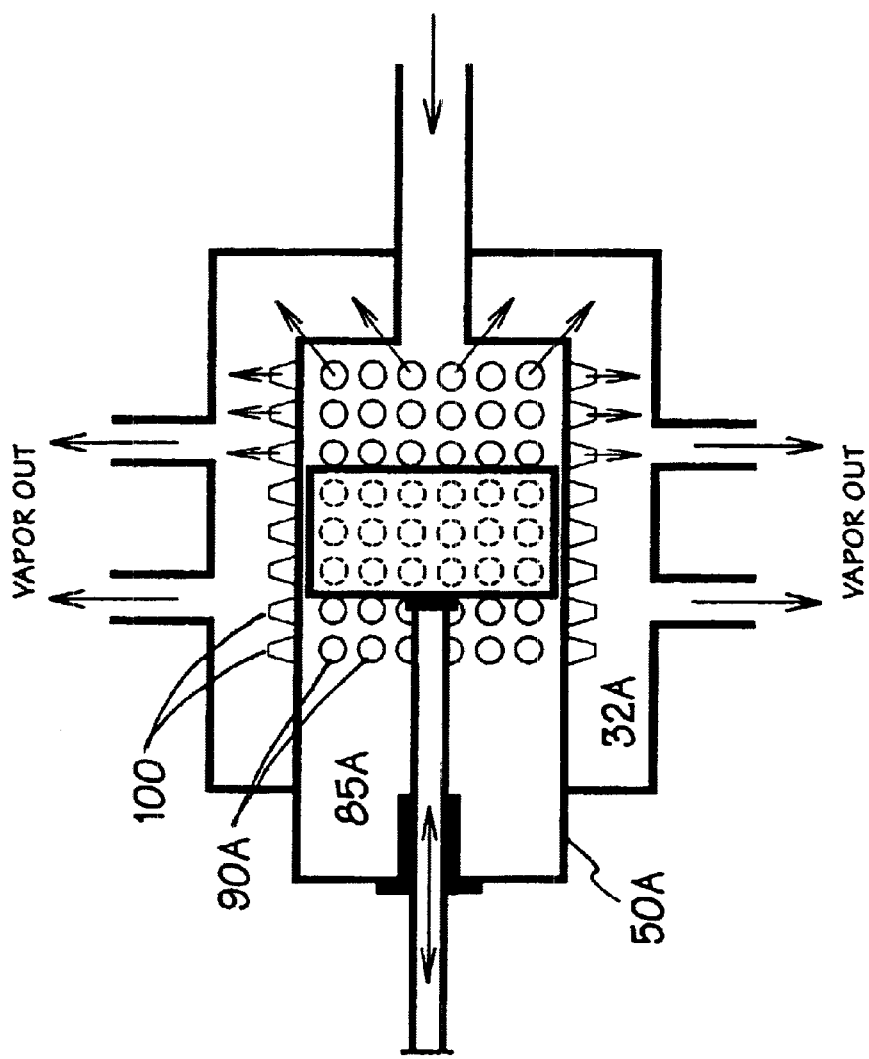
FIG. 3 is a detail view showing an alternate valve configuration for the orifices.

FIG. 3 shows an alternate embodiment of the invention in which the outlets 90A from the cylinder chamber 85A comprise a plurality of individual nozzles 100. Each nozzle 100 is inserted within an orifice 90A in the cylindrical wall of the cylinder. Each nozzle is preferably threadably engaged in the orifice so that it may be removed and replaced either for maintenance or replaced with a nozzle in a different size so as to optimize the performance of a multi-port unit. The particular shape of the nozzle and the length of the nozzle can also be optimized depending upon the particular application.

Figure 4:
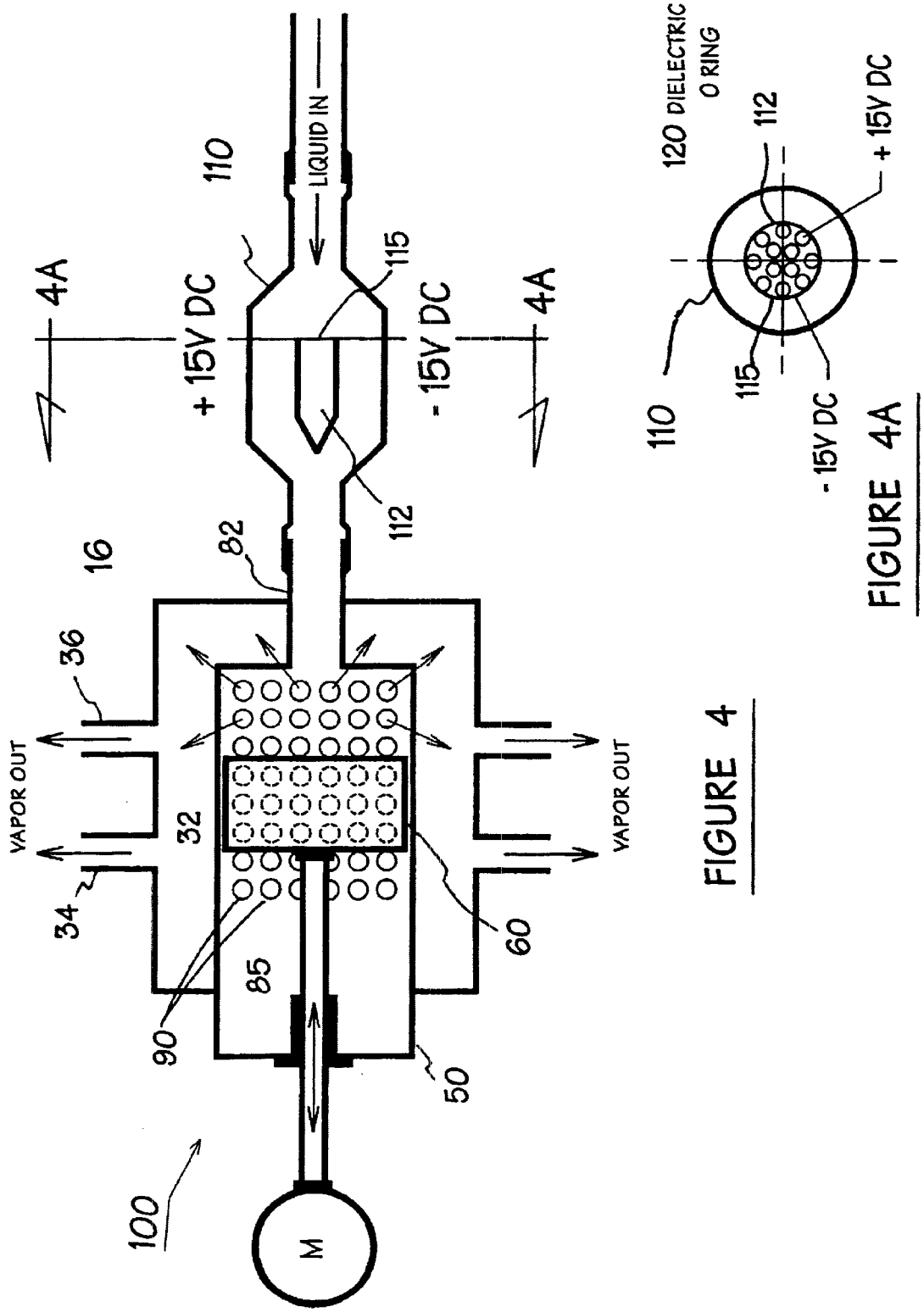
FIG. 4 is a schematic view of an alternate embodiment in which the expansion device incorporates an electrostatic atomizing device.

In FIGS. 4 and 4A, the expansion device 16 is shown and is as has been described above with reference to either FIGS. 2 or 3 having an inlet 82, outlets 34, 36. The valve body 50 receives a reciprocating piston 60 which regulates the discharge through orifices 90.

In this embodiment, designated by the numeral 100, an auxiliary electrostatic device 110 is shown located in the liquid inlet line leading from the condenser to the inlet 82 of the expansion device 16. The electrostatic device 110 includes a cell 112 through which the liquid to be atomized passes. The cell has an electrode 115 connected to a current source which may be alternate or direct current. The electrode is insulated by a dielectric ring 120. Preferably the components of the device 16 are conductive and are grounded so an electrical potential exists of sufficient intensity to cause atomization or partial atomization. Any remaining liquid as well as larger liquid droplets will be subjected to further atomization in the downstream device 16.

Figure 5:
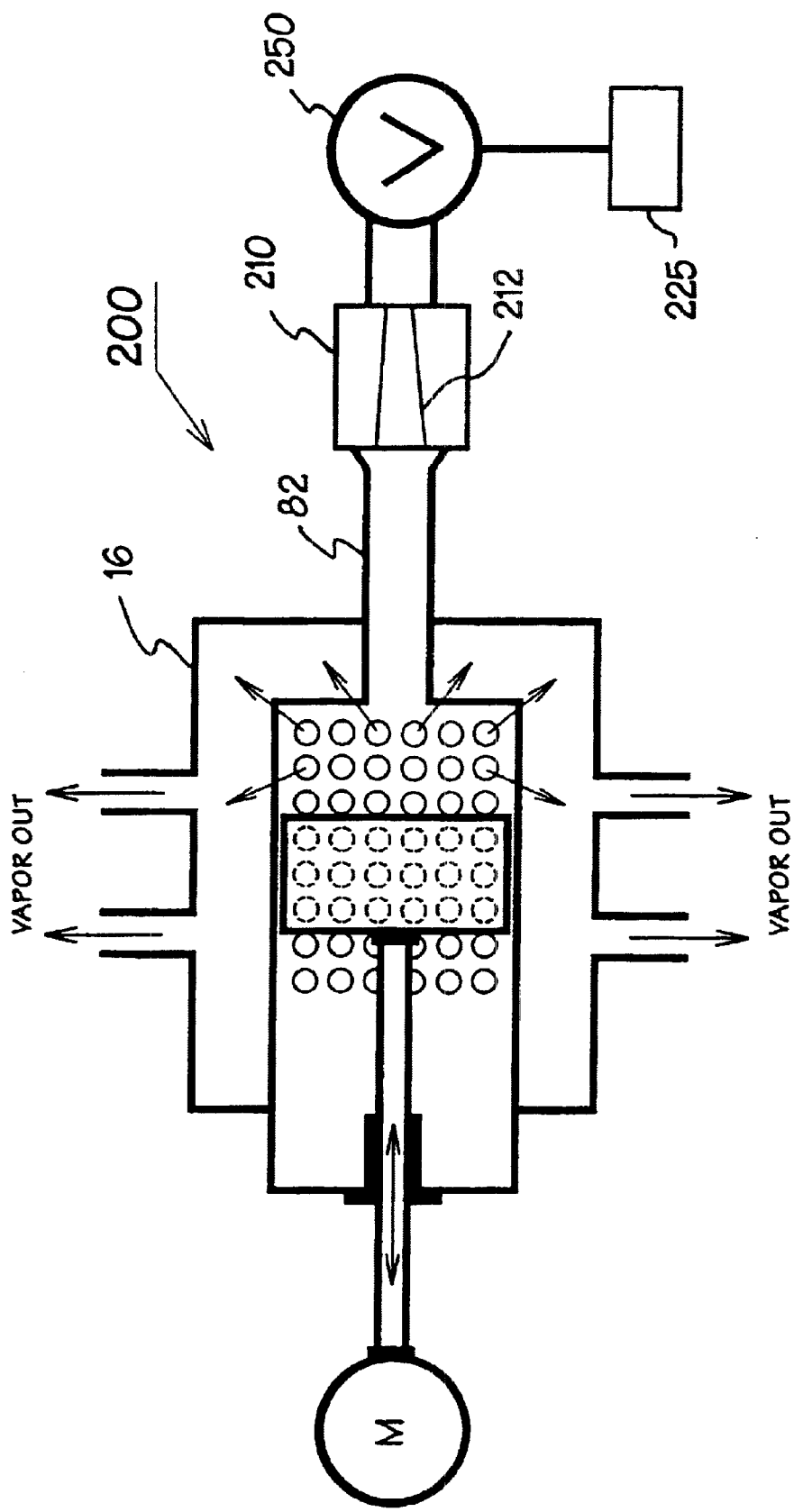
FIG. 5 shows a schematic view of yet another embodiment in which the expansion device incorporates an ultrasonic atomizing device.

In FIG. 5, an embodiment 200 is shown in which an expansion device 16, as described above, is shown in conjunction with an ultrasonic atomization device 210. The device 210 is located in the inlet 82 from the condenser. The ultrasonic device may be a ultrasonic nozzle which operates on the principle of capillary wave atomization in which sustained vibration is induced through a nozzle 212 that produces atomization. Nozzles of this type are well known in the field of spray coating technology.

To enhance the operation of the nozzle, a solenoid valve 250 may be positioned upstream of the nozzle and connected to a sensor 225 such as a temperature sensor which will cause the valve 250 to rapidly pulse open and close to send fluid charges to the nozzles.

The nozzle may also be electrically pulsed. Nozzles of this type include an electrically active element such as a piezoelectric transducer which can be pulsed or intermittently powered to achieve atomization.

Accordingly, the present invention provides an atomization valve for refrigerants which will atomize liquid from a condenser to a fully supersaturated state. The device is adjustable and will effectively atomize liquid droplets to a size to provide the greatest efficiency to achieve better heat transfer in the evaporator. Applications are numerous and are not limited to domestic refrigerators, domestic air conditioners, commercial air conditioners, supermarket, medium temperature and low temperature applications, ice machines, cascade systems and the like.

While the invention above has been described with reference to several preferred embodiments, it should be understood to those skilled in the art that various modifications, alterations and changes can be made within the spirit and scope of the invention.

It will be obvious to those skilled in the art to make various changes, alterations and modifications to the invention described herein. To the extent these various changes, alterations and modifications do not depart from the spirit and scope of the appended claims, they are intended to be encompassed therein.

We claim:

1. A device for expanding and vaporizing refrigerant in a compression refrigeration system of the type having a compressor, condenser and evaporator, said device comprising:

(a) a housing having a chamber with at least one outlet connectable to the evaporator;

(b) a valve in said housing having a valve chamber connected to receive liquid from the condenser; said valve having a wall defining a plurality of orifices communicating with said housing chamber;

(c) a piston in said valve chamber; and (d) drive means for operating said piston to position said piston to increase or decrease the volume of the valve chamber to increase or decrease the atomization effect.

2. The device of claim 1 wherein said drive means comprises a stepper motor.

3. The device of claim 1 wherein said stepper motor is operated by a temperature sensor sensing pressure at a location in the system.

4. The device of claim 1 wherein said orifices comprise a plurality of removable nozzles.

5. The device of claim 1 further including ultrasonic atomization means communicating with said valve chamber.

6. The device of claim 1 further including electrostatic atomization means communicating with said valve chamber.

7. A device for expanding and vaporizing refrigerant in a compression refrigerator system of the type having a compressor, condenser and evaporation in closed communication, said device comprising an electrostatic atomization device interposed between said condenser and evaporator.

* * * * *